G. W. McCOLLOM.
HARVESTER-REEL.
No. 188,021. Patented March 6, 1877.
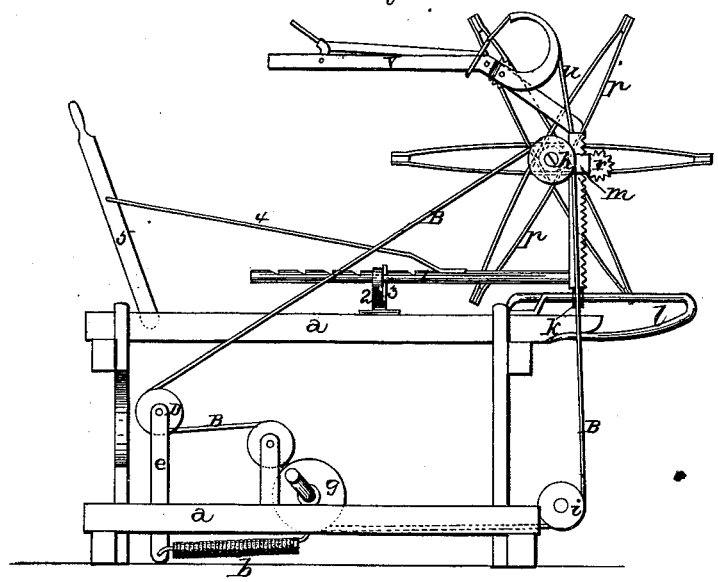
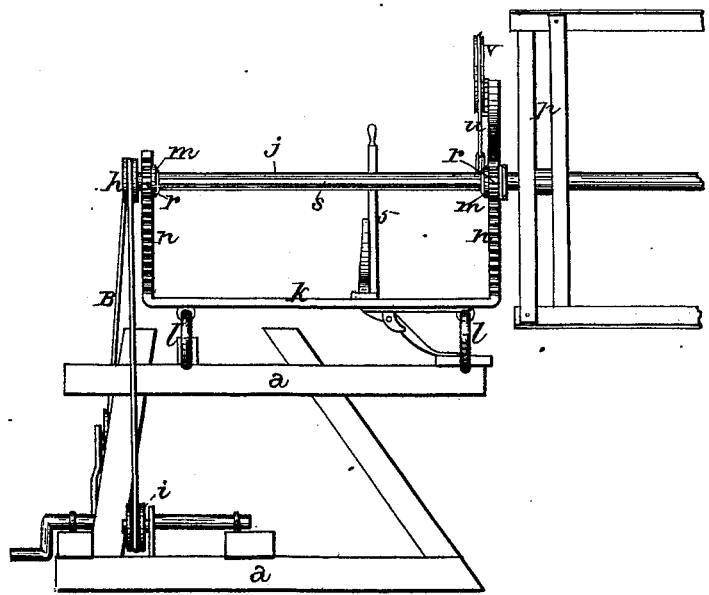
WITNESSES:
J. W. Garner
F. M. Burnham
INVENTOR:
Geo. W. McCollom
per
F. A. Lehmann,
atty.

UNITED STATES PATENT OFFICE.

GEORGE W. McCOLLOM, OF POLO, ILLINOIS, ASSIGNOR TO THE POLO HARVESTER COMPANY, OF SAME PLACE.

IMPROVEMENT IN HARVESTER-REELS.

Specification forming part of Letters Patent No. 188,021, dated March 6, 1877; application filed September 23, 1876.

*To all whom it may concern:*

Be it known that I, GEORGE W. McCOLLOM, of Polo, in the county of Ogle and State of Illinois, have invented certain new and useful Improvements in Adjustable Reels for Harvesters; and I do hereby declare the following to be a full, clear, and exact description of the invention, such as will enable others skilled in the art to which it pertains to make and use it, reference being had to the accompanying drawings, which form part of this specification.

My invention relates to an improvement in harvester-reels; and it consists in cogged standards, upon which the reel moves up and down, and an operating-lever and horizontally-moving slides, to which the standards are secured, whereby the reel can be adjusted up and down and back and forth, as will be more fully described hereinafter.

The accompanying drawings represent my invention.

$a$ represents a substantial frame of any desired construction, and which will be made of either wood or iron, as may be preferred. To the side of one of the drive-wheels is secured a grooved or sprocket pulley, $g$, and around this pulley passes a driving-chain, B, and from thence up over the pulley D, which is attached to the pivoted lever or bar $e$, and which has a coiled or other suitable spring, $b$, fastened to its lower end, so as to hold the pulley always pressed outward against the chain, and thus hold it taut. From the spring-pulley D the chain passes up over the pulley $h$ on the end of the reel-shaft $j$, and from thence down around the fixed pulley $i$ back to the driving-pulley $g$.

Upon the top of the frame $a$ are rigidly secured the two guides $l$, which project forward over the front end of the frame a suitable distance, and on which guides slides back and forth the bar $k$. This bar has its two ends turned vertically upward, so as to form the standards $n$, which have their front edges notched or serrated, as shown. Sliding up and down on these standards are the two boxes $m$, in which the reel-shaft $j$ is journaled, and to the front ends of these boxes are also journaled the two cogged pinions $r$, which mesh with the cogs on the front of the standards.

As the two boxes are connected together by means of the reel-shaft, and the two pinions are connected by the shaft $s$, when one pinion is made to move in either direction the other moves at the same time, and when the pinions move the shaft $j$, with its reel $p$, moves with it. Attached to one of the boxes is a chain, $u$, which has its upper end fastened to a hand-lever, V, that extends back to within easy reach of the driver, which lever is provided with the usual ratchet and pawl to hold it in any desired position. By means of this hand-lever, pinions, sliding boxes, and notched standards, the reel can be raised and lowered to any desired extent, so as to correspond to the height of the grain being cut.

Secured to the rear side of the bar $k$ is a long notched bar, 1, which projects back through the guide 2, and which is held in any desired position by means of a catch, 3, that is fastened to the side of the guide. Attached to this sliding bar 1 by means of the connecting-rod 4 is a hand-lever, 5, by means of which the bar is moved back and forth. As the bar $k$, on which the whole reel attachment rests, slides back and forth on the two guides $l$, and as the bar 1 is rigidly secured thereto, it will be readily seen that the reel can be moved back and forth by the hand-lever 5, at the will of the driver. By means of the two hand-levers the reel has two separate and independent movements, one horizontal and the other vertical. When the reel is adjusted vertically the chain B is either tightened or loosened to such an extent that it is necessary to move the reel either back or forward, so as to adjust the chain to the new position.

Having thus described my invention, I claim—

1. The combination of the guides $l$ on the front of frame, the two cogged standards $n$, that are connected together by the bar $k$, and move horizontally back and forth on the said guides, and a lever for moving the standards, substantially as specified.

2. The combination of the guides $l$, sliding cogged standards $n\ k$, moving thereon, notched bar 1, a guide, 2, a catch, 3, and a lever, 5; substantially as described.

3. In a harvester-reel, the combination of fixed guides on the frames, cogged standards that move horizontally thereon, and a reel that moves up and down upon the said standards, the two movements of the reel being at right angles to each other, whereby it can be accurately adjusted in relation to the cutter-bar, substantially as shown and described.

In testimony that I claim the foregoing I have hereunto set my hand this 9th day of September, 1876.

GEORGE W. McCOLLOM.

Witnesses:
H. PORTER,
J. W. ALLABEN.